(12) United States Patent
Jensen

(10) Patent No.: US 12,738,403 B2
(45) Date of Patent: Sep. 15, 2026

(54) METHODS AND SYSTEMS FOR MAGNETIC SHIELDED TRANSMITTER SYSTEM

(71) Applicant: Jørgen Selmer Jensen, Hjerm (DK)

(72) Inventor: Jørgen Selmer Jensen, Hjerm (DK)

( * ) Notice: Subject to any disclaimer, the term of this patent is extended or adjusted under 35 U.S.C. 154(b) by 28 days.

(21) Appl. No.: 18/402,728

(22) Filed: Jan. 3, 2024

(65) Prior Publication Data

US 2025/0218635 A1 Jul. 3, 2025

(51) Int. Cl.

*H01F 7/06* (2006.01)
*G01D 5/20* (2006.01)
*H01F 27/24* (2006.01)
*H01F 27/28* (2006.01)

(52) U.S. Cl.

CPC ............... *H01F 7/064* (2013.01); *G01D 5/20* (2013.01); *H01F 27/24* (2013.01); *H01F 27/28* (2013.01)

(58) Field of Classification Search

CPC .......... H01F 7/064; H01F 27/24; H01F 27/28; G01D 5/20

See application file for complete search history.

(56) References Cited

U.S. PATENT DOCUMENTS 3,717,876 A * 2/1973 Volkers .................... H01Q 1/44 343/788
4,021,728 A * 5/1977 Makino ................ G01R 33/093 338/32 R
5,258,766 A * 11/1993 Murdoch ........... G06K 7/10336 343/742
5,315,244 A * 5/1994 Griebeler ................ G01P 13/02 324/207.13
8,618,997 B2 * 12/2013 Kato ........................ H01Q 7/06 343/788
10,903,688 B2 * 1/2021 Peralta .................. H01F 27/366

* cited by examiner

*Primary Examiner* — Thienvu V Tran
*Assistant Examiner* — Muaamar Qahtan Al-Taweel

(57) ABSTRACT

In one aspect, a quadratic ferrite cube, wherein the quadratic ferrite cube comprises a hollow interior portion, wherein quadratic ferrite cube comprises a geometric shape that exhibits a same magnetic performance in an X direction, a Y direction, and a Z direction; a plurality of copper windings placed on an external portion of the quadratic ferrite cube; and a control and driving circuitry located inside the hollow interior portion, wherein the quadratic ferrite cube is used to generate a X, Y, Z magnetic field, and wherein the quadratic ferrite cube is used as a shielded room for a control and driving circuitry by generating the X, Y Z magnetic field in a range 20 KHz to 50 KHz for a magnetic based position system.

18 Claims, 7 Drawing Sheets

600

700

METHODS AND SYSTEMS FOR MAGNETIC SHIELDED TRANSMITTER SYSTEM

BACKGROUND

With the proliferation of games, virtual reality, sports training and the like, there is a greater use for the ability to determine the position and follow human movements. One method suitable for position determination is a transmitter system that delivers an X, Y, Z magnetic field in the room. A receiver registers this field in each position. This allows the receiver to calculate where it is in relation to the transmitter. The magnetic field decreases with the distance in 3rd power and therefore becomes weak rather quickly. Therefore, to achieve a good range with good precision, a noiseless receiver as well as a powerful transmitter are required. Accordingly, there is a desire to improve the systems that generate a powerful transmission.

To generate a X, Y, Z magnetic field in a room, a so-called room coil can be used to transmit the magnetic field. To predict the position, a certain signal strength can be used. A long distance between the transmitter and the receiver can be solved by using a bigger transmitter coil. Also, the use of higher power and the use of ferrite in the transmitter coil helps solving the problem. When it is desired to transmit a signal that it can be used to make a valid determination of the position several meters away from the transmitter coil, a several Watt per X, Y, Z winding can be used. The driving circuitry to generate and control this field also can waste several Watts. Furthermore, the field strength close to the transmitter can be considerable. Because of this considerable field strength, the sensitive electronic circuitry of the driver can be placed at a certain distance away from the transmitter. The driver circuitry can be shielded and then place the shielded box close to the transmitter but the shielding can distort the magnetic field. Imprecise position measurements can occur. Using the known technology this would call for a solution with two (2) boxes placed away from each other.

SUMMARY OF THE INVENTION

In one aspect, a quadratic ferrite cube, wherein the quadratic ferrite cube comprises a hollow interior portion, wherein quadratic ferrite cube comprises a geometric shape that exhibits a same magnetic performance in an X direction, a Y direction, and a Z direction; a plurality of copper windings placed on an external portion of the quadratic ferrite cube; and a control and driving circuitry located inside the hollow interior portion, wherein the quadratic ferrite cube is used to generate a X, Y, Z magnetic field, and wherein the quadratic ferrite cube is used as a shielded room for a control and driving circuitry by generating the X, Y Z magnetic field in a range 20 KHz to 50 KHz for a magnetic based position system.

Figure 1:
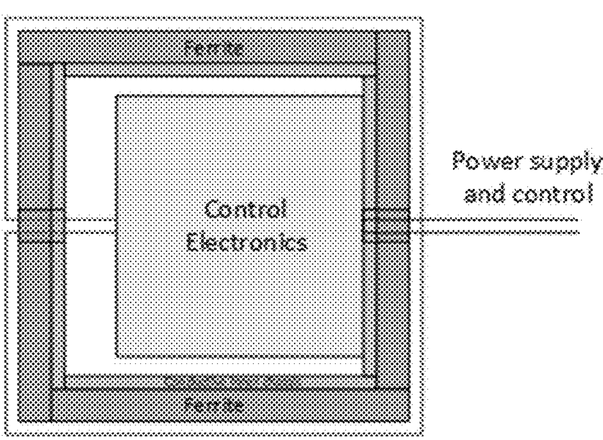
FIG. 1 illustrates an example magnetic shielded transmitter system, according to some embodiments.
Figure 1:

The Figures described above are a representative set and are not an exhaustive with respect to embodying the invention.

DESCRIPTION

Disclosed are a system, method, and article of manufacture for magnetic shielded transmitter system. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Magnetic transducer can be a device for transforming mechanical into electrical energy. Magnetic transducer can include a magnetic field including a variable-reluctance path and a coil surrounding all or a part of this path. Variation in reluctance leads to a variation in the magnetic flux through the coil and a corresponding induced electromotive force.

Q factor can be a measurement of a resonant system's relative bandwidth.

Resonance system can be a coupling where the energy moves back and forth between the coil and the capacitor. The more lossless the coil and capacitor, the less energy is lost during this process.

Transducer is a device that converts energy from one form to another.

The Following Nomenclature is Used Herein:

K means 10^3, M means 10^6, m means 10^−3, μ means 10^−6, n means 10^−9.

Units from the MKSA system is used.

Unless noted, all AC values are RMS.

EXAMPLE SYSTEMS AND METHODS

The present disclosure provides a method of creating a magnetic field to be used for determining a spatial position. In large installations of several meters, quite strong fields are required. The generation of these fields can take place using X, Y, Z wound magnetic transducers. The frequency range for this can be 20 KHz to 50 KHz. These transducers can generate a magnetic field which can cause problems in the associated electrical control circuit and therefore the control circuit must normally be placed some distance away from the transducer itself. Accordingly, the electrical control circuit can be placed inside a closed ferrite structure which at the same time forms a basis for the winding of copper which thereby increases the efficiency of the transducer. In some embodiments, a structure is provided where it is only necessary with 1 single integrated device instead of 2 devices to be placed some distance apart.

FIG. 1 illustrates an example magnetic shielded transmitter system 100, according to some embodiments. In some examples, as shown in FIG. 1, we have a quadratic ferrite cube built so it is hollow inside. The copper windings are placed on the outside. The control and driving circuitry are placed inside. An optional internal conductive chassis can be provided as is also shown. Magnetic shielded transmitter system 100 can use a shielded room coil to reduce the need for two (2) boxes to one (1) box only.

Magnetic shielded transmitter system 100 can include a cube form. The cube form allows for a geometric shape that exhibits the same magnetic performance in X, Y, Z direction.

Magnetic shielded transmitter system 100 can utilize ferrite. For example, magnetic shielded transmitter system 100 can use ferrite to form the cube and thus, to increase the efficiency (e.g. field strength per Watt) compared to an air coil.

The ferrite portion can include a hollow portion. The hollow portion can provide room/space inside the ferrite where the magnetic field strength is reduced. Accordingly, the field strength can be reduced so much that we can place the sensitive electronic circuitry here.

The reduced magnetic field inside can enable placement of a conductive shield with it. The shield can be used for fixing the ferrites and for fixing the electronics. The placement of a conductive inner chassis is optional.

The placement of a conductive chassis inside can further reduce the residual magnetic field. The cost is a loss in Q factor. This loss can result in increased heat in the system. System 100 can utilize various designs to reduce the loss in Q by ensuring that the main part of the magnetic flux flow in the ferrite.

The placement of a conductive chassis can be open for effective solutions in conducting the heat transfer from the driving electronics to the surface via the ferrite. In this way, system 100 can provide, as noted, a solution with only one box in stead of two boxes. The user does not have to consider how to place box #2 relative to box #1.

The combination of using cube of ferrite used as basis for generating a X, Y, Z magnetic field and use of ferrites to generate a shielded room for electronics can be used for generating a X, Y Z magnetic field in the range 20 KHz to 50 KHz for magnetic based position system. Accordingly, system 100 can include a cube of ferrite, wound with copper wire, "hollow" inside, to generate an X, Y, Z magnetic signal. System 100 can then place the driver circuitry inside this.

Figure 2:
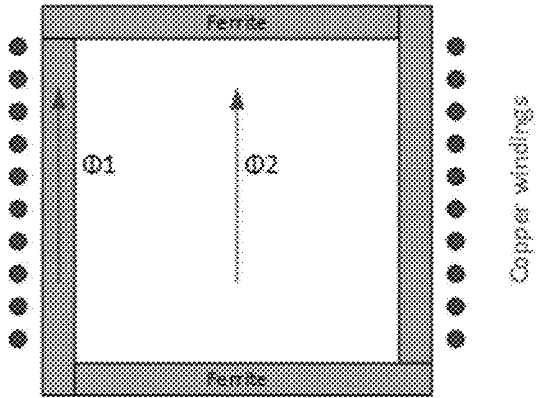
FIG. 2 illustrates an example hollow ferrite structure, according to some embodiment.
Figure 2:
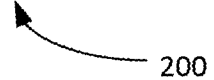

FIG. 2 illustrates an example hollow-ferrite structure 200, according to some embodiment. The ferrite structure can be a cube. The copper windings are driven by an AC current. Windings can be placed in both X, Y and Z directions. Only one example of which is shown in FIG. 2. The number of windings times the current is the driving force that drives the magnetic flux.

$$\Theta = N * i[A]$$

The Magnetic Flux $$\Phi = \frac{\Phi}{Rm}[Wb]$$

Where Rm is the magnetic resistance.

The flux of interest is the flux that passes the ferrite structure and the flux that passes the air in the inner structure.

Figure 3:
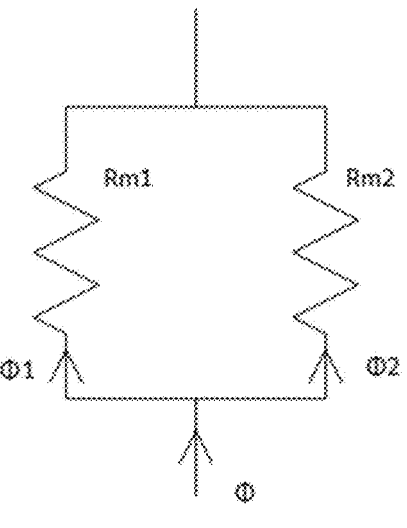
FIG. 3 illustrates an example equivalent system for the hollow-ferrite structure, according to some embodiments.
Figure 3:
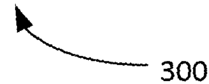

FIG. 3 illustrates an example equivalent system 300 for the hollow-ferrite structure 200, according to some embodiments.

Figure 4:
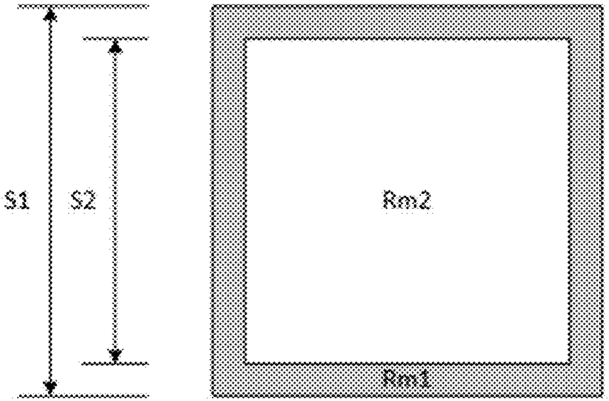
FIG. 4 illustrates across section of the structure provided herein, according to some embodiments.
Figure 4:
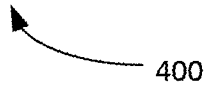

FIG. 4 illustrates a cross section of the structure provided herein, according to some embodiments. Rm1 and Rm2 can share the total flux. Now we can calculate the magnetic resistance with respect to the area and the permeability.

$$Rm2 = C1/S_2^2$$

And $$Rm1 = \frac{C1}{\mu_{rel} * (S_1^2 - S_2^2)}$$

The constant C1 can be the same for the two equations.

The following can be used to determine the damping D, of the structure. Here D means how large a portion of the total flux is passing through the air inside.

$$D = \frac{\Phi 2}{\Phi} = \frac{\Phi 2}{\Phi 1 + \Phi 2} = \frac{1}{1 + \frac{\Phi 1}{\Phi 2}}$$

The relation between the 2 fluxes is the reciprocal of the resistance:

$$\frac{\Phi 1}{\Phi 2} = \frac{Rm2}{Rm1} = \frac{\mu_{rel} * (S_1{}^2 - S_2{}^2)}{S_2{}^2}$$

$$D = \frac{1}{1 + \frac{\mu_{rel} * (S_1{}^2 - S_2{}^2)}{S_2{}^2}}$$

In one example, ferrite thickness is 5.8 mm.

$$\mu_{rel} = 600;\ S1 = 105\ \text{m[m]};\ S2 = 93.4\ \text{m[m]} \rightarrow D = 6.2\ \text{m}$$

A larger structure and better ferrite can be utilized. For example, ferrite thickness can be 3 mm.

$$\mu_{rel} = 3000;\ S1 = 150\ \text{m[m]};\ S2 = 144\ \text{m[m]} \rightarrow D = 3.9\ \text{m}$$

By design it is possible to change size and damping.

Figure 5:
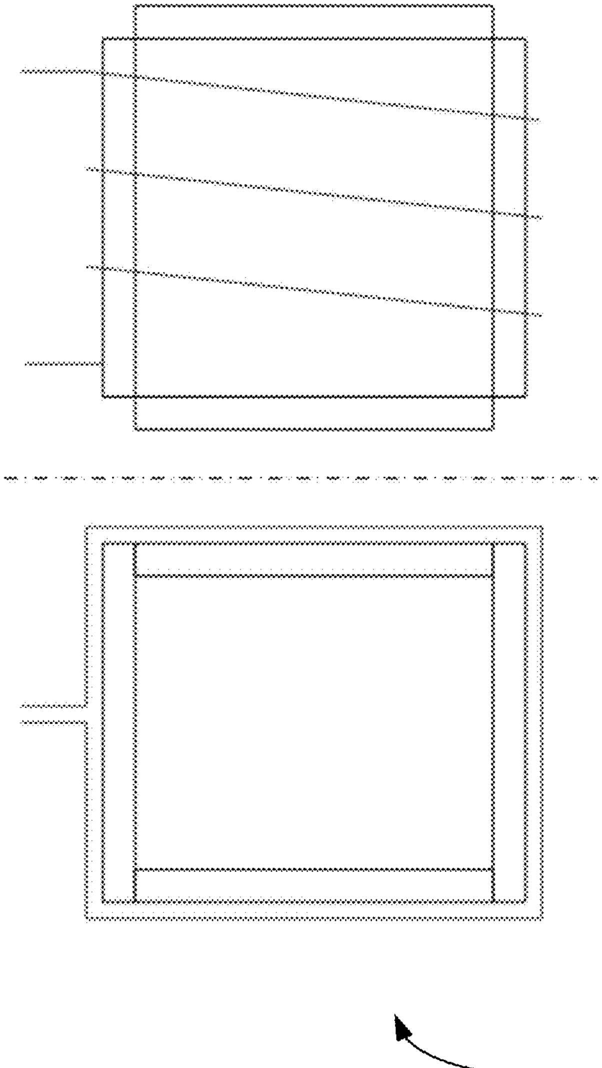
FIG. 5 illustrates an example tiles set up, according to some embodiments.

FIG. 5 illustrates an example tiles set up, according to some embodiments. A series of measurements can be made. The test set up is built by six (6) tiles as shown in FIG. 5 is provided by way of example. The tiles can be used to damp high frequency waves in a radio anechoic chamber. The size can be 100 m*100 m*5.8 m[m3]. The tiles can be measured to find $\mu_{rel}$=600. The precision of this result is reduced because of the limited possibilities given by the tiles. The loss factor (e.g. hysteresis and dynamic loss) can be taken as a parameter for tile set up. In one example, a cube is made using six (6) tiles.

It is not possible to make an ideal cube using six (6) tiles of the same size. For example, the ferrite tiles can be fastened to wood by glue. The wood takes up some space of the inside as can be seen on the photo FIG. 6. This can be evaluated to be 'good enough' to verify the basic properties of the structure. The structure can be wound with twenty-three (23) windings d=1.4 m[m] stiff copper wire. The inductance is measured to be L=220 u[H]. A 200n [F], high Q capacitor is connected in series to form a resonance. The Q factor of the capacitor is much higher than the Q in the coil. Accordingly, the capacitor can be omitted in the total Q determination. The circuit can be driven by a power generator. The measurements are done at the resonance frequency which is 24.5K[Hz] for this set up.

Figure 6:
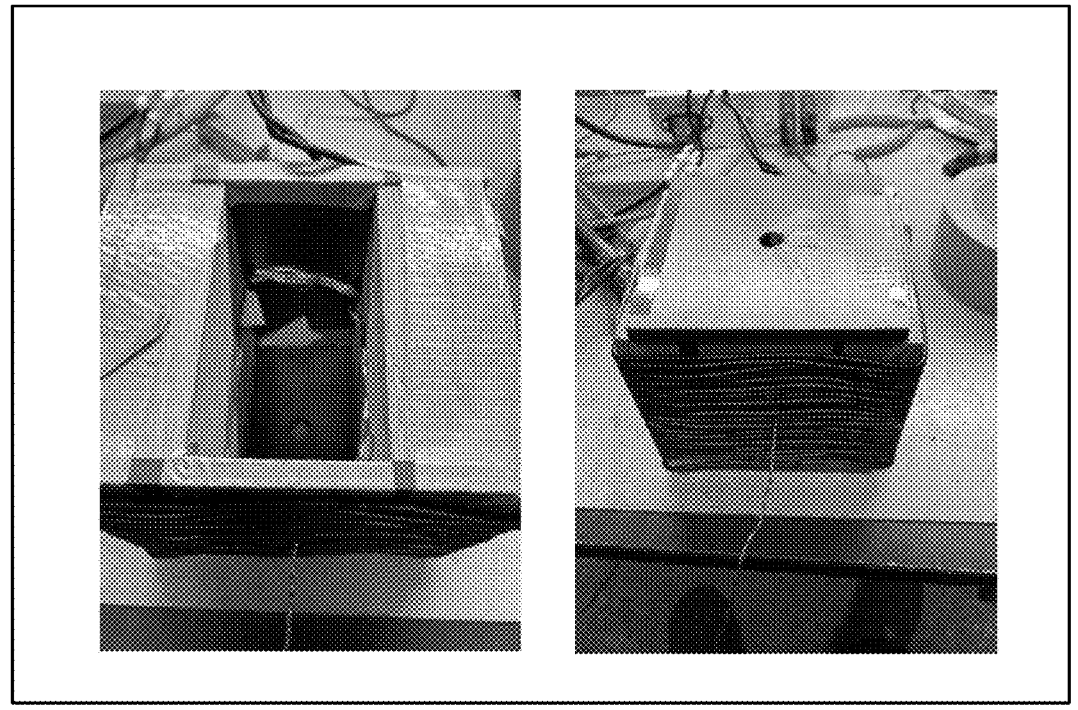
FIG. 6 illustrates an example photograph of a magnetic shielded transmitter system, according to some embodiments.

FIG. 6 illustrates an example photograph of a magnetic shielded transmitter system 100, according to some embodiments. The power generator is adjusted such that the voltage across the 23 windings is 152 [V].

From this, the voltage across one winding can be determined as 6.6 [V] corresponding to $$\frac{d\Phi}{dt} = 6.6\ [\text{V}]$$

(e.g. if the voltage loss in the copper is omitted).

$L_B$ is noted discussed.

$$L_B = \frac{dB}{dt}\left[\frac{\text{V}}{\text{m}^2}\right] \text{ where } B = \Phi/Ar$$

It is noted that the frequency dependence is hidden into the differentiation. The measurements here conform to 24.5K[Hz] only and are provided by way of example.

$L_B$ for the outer field is calculated:

$$L_B(\text{outer}) = \frac{\frac{d\Phi}{dt}}{Ar_{outer}} = \frac{6.6}{100\ \text{m} * 106\ \text{m}} = 623\left[\frac{\text{V}}{\text{m}^2}\right]$$

In FIG. 6 is shown a pick-up coil placed inside. The pick-up coil:

Area=85 m*45 m=3.8 m[m$^2$] and N=5. The measured voltage on the pick-up coil is 96 m[V]. $L_B$ for the inner field is calculated:

$$LB(\text{inner}) = \frac{\frac{d\Phi}{dt}}{Ar_{inner} * N} = \frac{96\ \text{m}}{38\ \text{m} * 5} = 5.05\left[\frac{\text{V}}{\text{m}^2}\right].$$

A square of 3.16 cm*3.16 cm can have an induced voltage of 7 m[V]. The actual damping becomes $A_{ctual}$=5.05/623=8.1 m. This can be slightly higher than the calculated 5.9 m, but talking about magnetics, small airgaps, and the precision in this setup can be factored in.

Now the flux into the ferrite can be calculated:

The total area of the ferrite can be 4*100 m*5.8 m=2.32 m[m$^2$]

The frequency is 24.5K[Hz]→ω=154K[rad/s]

$$\frac{d\Phi}{dt} = \omega * \Phi = U$$

$$B = \frac{\Phi}{Ar} = \frac{U}{Ar * \omega} = 6.6/(2.43\ \text{m} * 154\text{K}) = 17.6\ \text{m[T]}$$

Then $$B\text{max} = B * \sqrt{2} = 24.9\ \text{m[T]}$$

The safe distance to saturation can be above 100 m[T]. The measurement of Q is performed by finding Δf/f; where Δf is the 3 dB down frequencies. The measured Q@24.5 KHz by 3 dB bandwidth is 58. A copper layer can be added inside. The layer thickness can be 0.1 mm.

Figure 7:
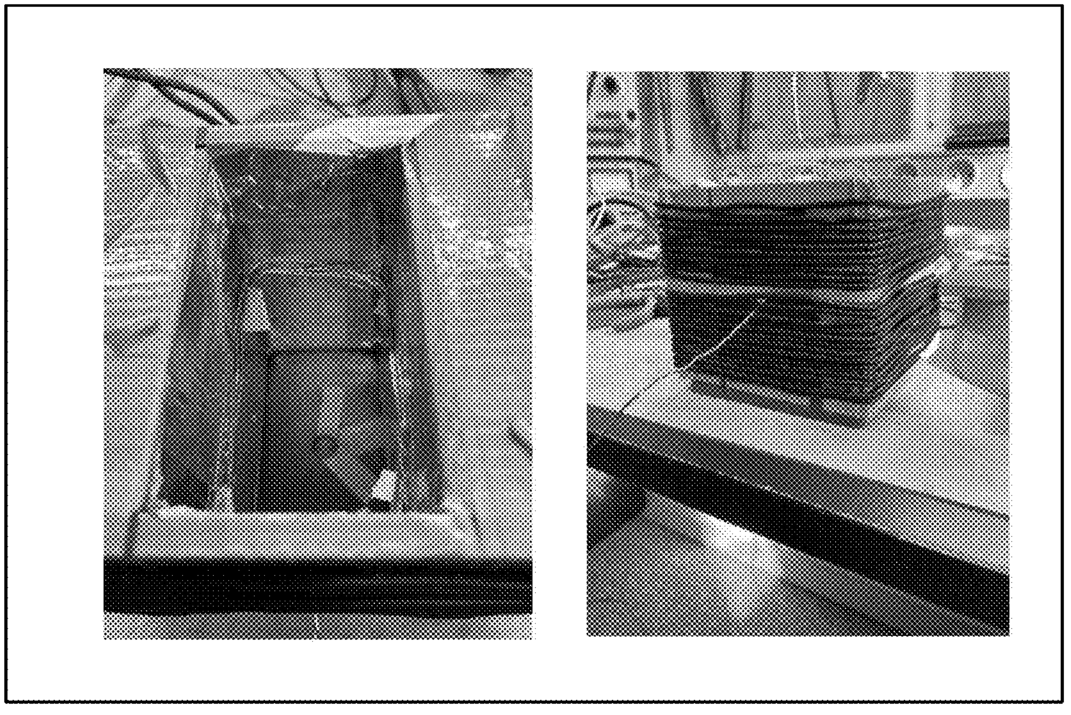
FIG. 7 illustrates an example of how copper forms a short-circuit of the leakage flux, according to some embodiments.

FIG. 7 illustrates an example of how copper forms a short-circuit of the leakage flux, according to some embodiments. A test ca be made to determine how much a conductive inner layer changes the magnetic properties seen from outside, especially on the Q factor but also to find the reduction of the inner magnetic flux.

Example results are now discussed (by way of example).

The measurement is carried out at 6.6 [V] across one winding corresponding to $$\frac{d\Phi}{dt} = 6.6\ [\text{V}]$$

Measured Q@24.5K[Hz] by 3 dB bandwidth is 51.

The measured voltage on the pick-up coil is 30 m[V]

$L_B$ for the inner field is calculated:

$$L_B(\text{inner}) = \frac{\frac{d\Phi}{dt}}{Ar_{inner} * N} = \frac{30\ \text{m}}{3.8\ \text{m} * 5} = 1.6\left[\frac{\text{V}}{\text{m}^2}\right]$$

The damping is 1.6/623=2.6 m

This corresponds to 389 times smaller field strength inside than outside.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium). Accordingly, the specification and drawings are to be regarded in an illustrative rather than a restrictive sense.

What is claimed is:

1. A magnetic shielded transmitter system, comprising:

a quadratic ferrite cube, wherein the quadratic ferrite cube comprises a hollow interior portion, wherein quadratic ferrite cube comprises a geometric shape that exhibits a same magnetic performance in an X direction, a Y direction, and a Z direction;

a plurality of copper windings placed on an external portion of the quadratic ferrite cube; and a control and driving circuitry located inside the hollow interior portion, wherein the quadratic ferrite cube is used to generate a X, Y, Z magnetic field, wherein the quadratic ferrite cube is used as a shielded room for a control and driving circuitry by generating the X, Y Z magnetic field in a range 20 KHz to 50 KHz for a magnetic based position system, and wherein a tile comprises a dimension measurement of 100 m*100 m*5.8 m[m3],and wherein each tile is measured to find μrel=600.

2. The magnetic shielded transmitter system of claim 1, wherein the plurality of copper windings are wound around the external surface of the quadratic ferrite cube.

3. The magnetic shielded transmitter system of claim 2 further comprising:

an internal conductive chassis within the quadratic ferrite cube.

4. The magnetic shielded transmitter system of claim 3, wherein the hollow portion comprises a reduced magnetic field strength for safe placement of the control and driving circuitry.

5. The magnetic shielded transmitter system of claim 4, wherein the reduced magnetic field is configured for placement of a conductive shield with the hollow interior portion.

6. The magnetic shielded transmitter system of claim 4, wherein the conductive shield is used for fixing any ferrite elements and for fixing the control and driving circuitry.

7. The magnetic shielded transmitter system of claim 5, wherein a placement of a conductive chassis inside the quadratic ferrite cube reduce a residual magnetic field, and wherein the quadratic ferrite cube is configured for a main part of the magnetic flux flow occurs in the ferrite.

8. The magnetic shielded transmitter system of claim 7, wherein the quadratic ferrite cube comprises six (6) tiles of the same size on each side, and wherein the. For example, the ferrite tiles can be fastened to a wood side of the quadratic ferrite cube by a glue adhesive.

9. The magnetic shielded transmitter system of claim 8, wherein the six tiles can be used to dampen high frequency waves in a radio anechoic chamber.

10. The magnetic shielded transmitter system of claim 9, wherein ferrite thickness is 3 mm.

11. The magnetic shielded transmitter system of claim 10, wherein structure is wound with twenty-three (23) windings d=1.4 m[m] stiff copper wire.

12. The magnetic shielded transmitter system of claim 11, wherein an inductance is measured to be L=220 μ[H].

13. The magnetic shielded transmitter system of claim 12, wherein a 200 n[F], high Q capacitor is connected in series to form a resonance.

14. The magnetic shielded transmitter system of claim 13, wherein power generator coupled with the stiff copper wire is adjusted such that the voltage across the 23 windings is 152 [V].

15. The magnetic shielded transmitter system of claim 14, wherein from this, the voltage across one winding of the stiff copper wire determined as 6.6 [V] corresponding to $$\frac{d\Phi}{dt} = 6.6\ [\text{V}].$$

16. The magnetic shielded transmitter system of claim 15, wherein a placement of a conductive chassis is open for conducting a heat transfer from the driving electronics to the surface via the ferrite.

17. The magnetic shielded transmitter system of claim 16, wherein magnetic shielded transmitter system a solution with only one box instead of two boxes.

18. The magnetic shielded transmitter system of claim 1, wherein a ferrite thickness is 5.8 mm.

* * * * *